United States Patent
Ziegler

(10) Patent No.: US 9,426,083 B2
(45) Date of Patent: Aug. 23, 2016

(54) CONSISTENCY CHECKING FOR CREDIT-BASED CONTROL OF DATA COMMUNICATIONS

(75) Inventor: Michael L. Ziegler, Roseville, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 1720 days.

(21) Appl. No.: 12/569,824

(22) Filed: Sep. 29, 2009

(65) Prior Publication Data

US 2011/0075555 A1 Mar. 31, 2011

(51) Int. Cl.
*H04L 12/801* (2013.01)
*H04L 12/931* (2013.01)
*H04L 12/939* (2013.01)

(52) U.S. Cl.
CPC ............ *H04L 47/39* (2013.01); *H04L 49/505* (2013.01); *H04L 49/555* (2013.01)

(58) Field of Classification Search
CPC ...................................................... H04L 47/39
See application file for complete search history.

(56) References Cited

U.S. PATENT DOCUMENTS

| | | | |
|---|---|---|---|
| 5,557,610 A | 9/1996 | Calamvokis et al. | |
| 6,044,406 A | 3/2000 | Barkey et al. | |
| 7,408,927 B2 | 8/2008 | George | |
| 7,792,118 B2* | 9/2010 | Chao et al. | 370/395.1 |
| 2006/0050639 A1* | 3/2006 | Stuart et al. | 370/235 |
| 2007/0233918 A1* | 10/2007 | Check et al. | 710/100 |
| 2009/0043880 A1* | 2/2009 | Dickens et al. | 709/224 |
| 2009/0196303 A1 | 8/2009 | Battle et al. | |

* cited by examiner

*Primary Examiner* — Jason Mattis
(74) *Attorney, Agent, or Firm* — Hewlett Packard Enterprise Patent Department

(57) ABSTRACT

A credit-based method for controlling data communications in a computer system between a sender and a receiver coupled by an ordered communication link is described herein. A request for a credit check is transmitted from the sender to the receiver via the ordered communication link. An initial number of credits are allocated to the sender in a credit counter. A snapshot counter is set to a value of the credit counter and us updated as returned credits are received. A number of reported credits are determined based on a credit check response message received from the receiver. The returned credits are ordered relative to the credit check response message. The number of credits is checked for consistency based on a number of the snapshot counter and the number of reported credits.

20 Claims, 7 Drawing Sheets

CONSISTENCY CHECKING FOR CREDIT-BASED CONTROL OF DATA COMMUNICATIONS

I. BACKGROUND

A conventional network device, such as a switch or router, includes three major components: a control processor, a line card, and a switch fabric. The conventional control processor implements various control and administrative functions, such as executing routing protocols. The line cards generally terminate physical links on the network device and implement the specific protocol processing functions that define a particular network. On input, a processing function may include determining a next node in the network to which the packet should be sent. On output, a processing function may include scheduling the packet for transmission on an outgoing link, for example, using a queuing subsystem.

The switch fabric is responsible for transferring packets from the nodes (e.g., line cards) from which the packet was received to the nodes (e.g., line cards) for the outgoing link connected to the next node in the network. For example, after a forwarding decision is made, a packet is sent to the switch fabric, which then sends the packet to a line card for the outgoing link. The packet is transmitted through the outgoing link to the next node.

The switch fabric typically includes fabric ingress ports, fabric egress ports, data buffers, and shared memory. Credit-based flow control may be used to control access to a resource, such as a buffer in the switch fabric. An individual credit represents a resource. The credits are allocated to a sending party ("producer" or "sender") for sending data to a receiving party ("consumer" or "receiver"). In other words, credit-based flow control may be used to prevent buffer overflow. As the producer sends data to the consumer, it uses a number of credits corresponding to the quantity of data being sent. When the credits allocated to the producer are depleted, the producer is not able to send more data. As the resource is freed on the consumer (i.e., data stored in the buffer is removed), credits are returned to the producer. As credits are replenished, the producer may send more data in proportion to the number of replenished credits.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Figure 1A:
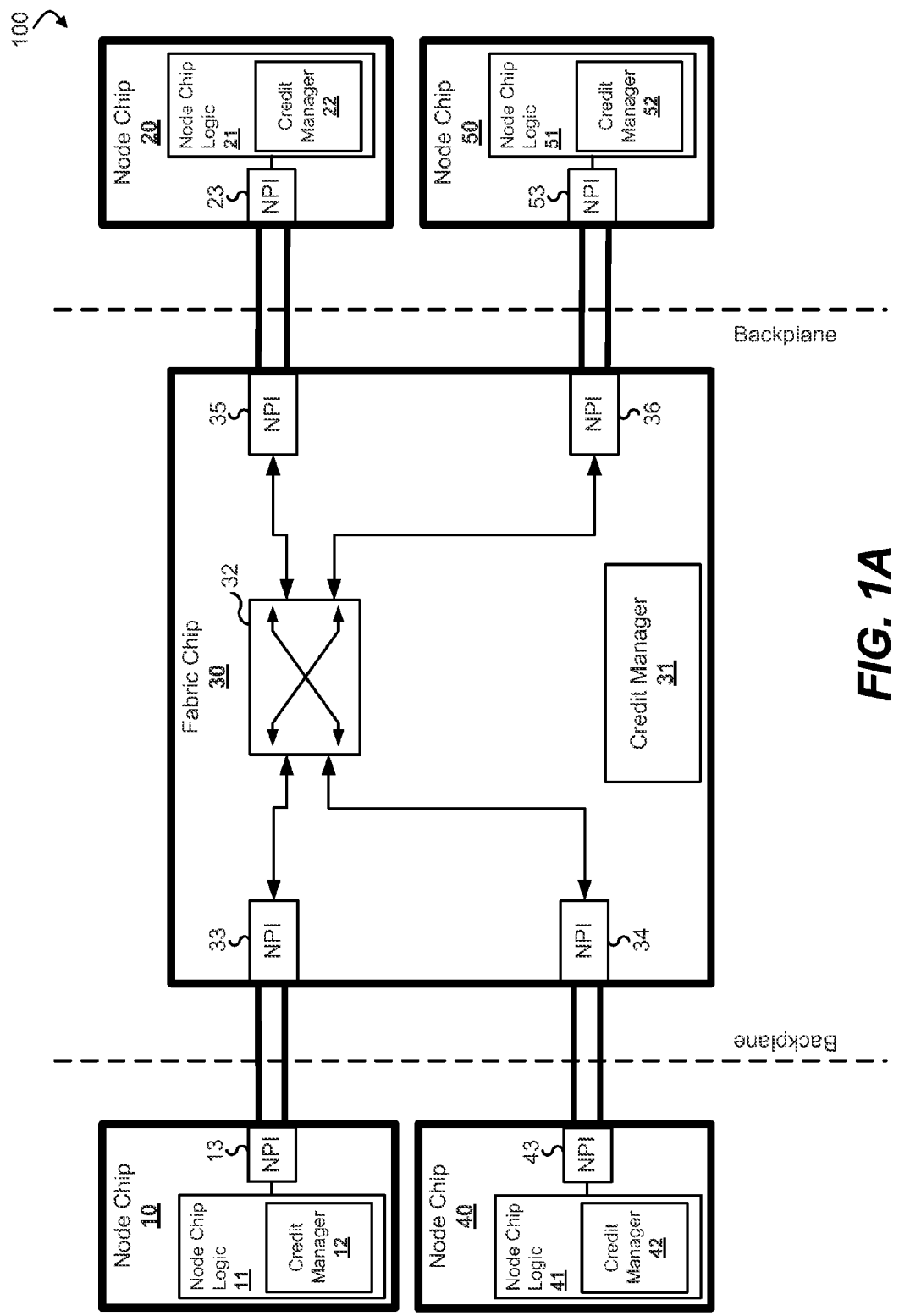
FIG. 1A is a topological block diagram of a backplane fabric and nodes of a network switch in accordance with an embodiment of the invention.

Various errors can interfere with credit-based flow control. If the data does not reach the intended consumer, the credits used in sending the data may not be recovered or returned to the producer. Credits are lost and as such, the efficiency of the communication decreases and may eventually be halted entirely. Other errors may cause the number of credits on the channel to be in excess of the allocation, creating the possibility that data may be sent at a time when there is no space available on the consumer, resulting in a possible loss or corruption of data.

As described herein, these and other errors interfering with credit-based flow control may be detected in a timely manner by consistency checking for the credit-based flow, and doing so without impacting the normal operation of the flow in a communication channel. Data and credits of the flow under normal operation may be constantly moving across the communication channel. For example, clock rates may average at 500 MHz or more and an event may occur every two nanoseconds causing counters representing the credits to be in a state of constant flux.

To determine the number of credits in a flow, consistency checking and/or validation may be performed by inserting a marker in the pipeline of an ordered channel of the flow. The marker may include a credit check request message and/or response. The marker may be used to capture all credits in a roundtrip of the channel excluding from consideration those data and credit transfers that are outside of the roundtrip, all the while without interrupting the flow of data and credits. In other words, an on-the-fly accounting of all credits in the flow is performed.

In one embodiment, a credit-based method for controlling data communications in a computer system between a sender and a receiver coupled by an ordered communication link is described. An initial number of credits is allocated to the sender in a credit counter, each credit corresponding to a portion of memory space in the receiver reserved to store a packet received from the sender. The sender may transmit a request for a credit check to the receiver. The request is transmitted via the ordered communication link. A snapshot counter may be set to a value of the credit counter, such that the value of the snapshot counter is the same as the value of the credit counter as of the time the request was transmitted. The snapshot counter may be updated as returned credits are received. The returned credits are ordered relative to the credit check response message. A number of reported credits are determined based on a credit check response message received from the receiver. The number of credits is checked for consistency based on a number of the snapshot counter and the number of reported credits.

In another embodiment, a network device for credit-based flow control is described. The network device may be comprised of a sender node including a credit manager, a receiver node including a buffer, and an ordered communication link, which couples the sender node to the receiver node for transmission of data packets from the sender node to the buffer of the receiver node. The credit manager may be configured to transmit a request for a credit check from the sender node to the receiver node via the ordered communication link, set a snapshot counter to a value of the credit counter, update the snapshot counter as returned credits are received, and determine a number of reported credits based on a credit check response message received from the receiver. The returned credits are ordered relative to the credit check response message. The credit manager is further configured to check the number of credits in the network device for consistency based on a number of the snapshot counter and the number of reported credits.

FIG. 1A is a topological block diagram of a backplane fabric and nodes of a network system 100 in accordance with an embodiment of the invention. Backplane fabric and nodes of system 100 are generally configured to switch packets from ingress node to an egress node. System 100 includes a node chip 10, a node chip 20, a node chip 40, a node chip 50, and a fabric chip 30. As used herein, a packet includes data that moves between the same or different nodes across the fabric and is regulated by the credit-based flow control. This includes network data packets, portions thereof, and node to node control messages that manage the transfer of network data packets or portions thereof.

Node chip 10 may be an ingress and/or egress line card of the network switch. Node chip 10 is operatively coupled to fabric chip 30 via node physical interface (NPI) 13. An NPI is configured to transmit and receive packets and link control messages across a communication link. As used herein, each NPI may have a pair of channels, such as a transmit (Tx) channel and a receive (Rx) channel. Each channel may have two serializer/deserializer (SerDes) lanes. The two SerDes lanes of the Tx channel may be synchronized into a single ordered channel in the transmit direction. Likewise, the two SerDes lanes of the Rx channel may be synchronized into a single ordered channel in the receive direction. Other types of known methods of providing ordered communication links may be used.

NPI 13 is operatively coupled to node chip logic 11 and to the fabric chip 30. Node chip logic 11 is operatively coupled to NPI 13 of node chip 10. Node chip logic 11 includes credit manager 12. Credit manager 12 is configured to track credits and to validate a credit flow between node chip 10 and fabric chip 30. On a transmit side of a link, credit manager 12 is configured to track credits available to send data. On the receive side of the link, credit manager 12 is configured to track how a buffer is used and return credits as buffer space is freed.

In one embodiment, node chip 10 is a producer. Credits may be allocated to node chip 10 for sending data to a consumer. One or more consumers may be contained in fabric chip 30. As used herein, a producer is a transmitter of data and a consumer is a receiver of data. In one embodiment, a producer provides packets to an NPI and one or more consumers receive packets from an NPI on an opposite side of a link. The flow of credits may be validated while the credits are moving across the communication channels between node chip 10 and fabric chip 30 for an entire roundtrip, including data on the communication channel that represents credits in use in addition to returned credits flowing in the opposite direction (i.e., return path).

Node chip 20 may be an ingress and/or egress line card of the network switch. Node chip 20 is operatively coupled to fabric chip 30 via NPI 23. NPI 23 is operatively coupled to node chip logic 21 and to fabric chip 30.

Node chip logic 21 is operatively coupled to NPI 23 of node chip 20. Node chip logic 21 includes credit manager 22. Credit manager 22 is configured to validate a credit flow between node chip 20 and fabric chip 30. In one exemplary credit flow, node chip 20 may be a receiving party or consumer. Credits may be allocated to a producer, such as fabric chip 30, for sending data to the consumer, such as node chip 20. The flow of credits may be validated while the credits are in flight across the communication channels between fabric chip 30 and node chip 20.

Node chip 40 may be an ingress and/or egress line card of the network switch. Node chip 40 is operatively coupled to fabric chip 30 via NPI 43. Node chip logic 41 is operatively coupled to NPI 43. Node chip logic 41 includes credit manager 42. The links associated with NPI 43 may form a single unified channel for communication between node chip 40 and fabric chip 30.

Node chip 50 may be an ingress and/or egress line card of the network switch. Node chip 50 is operatively coupled to fabric chip 30 via NPI 53. Node chip logic 51 is operatively coupled to NPI 53. Node chip logic 51 includes credit manager 52. The links associated with NPI 53 may form a single unified channel for communication between node chip 50 and fabric chip 30.

It is recognized that a packet may enter and exist on a same node chip, i.e., the node chip through which the packet was received is one and the same as the node chip for the outgoing link. In one embodiment, traffic that enters and exists on the same node chip travels over the fabric chip. In another embodiment, traffic that enters and exists on the same node chip is handled by that node chip and does not travel over the fabric chip.

Fabric chip 30 is operatively coupled to node chip 10, node chip 20, node chip 40, and node chip 50. Fabric chip 30 includes a plurality of NPIs, such as NPIs 33-36, and a switch fabric 32. Switch fabric 32 may be a non-blocking fabric, such as a buffered crossbar, and include a plurality of fabric ingress ports and a plurality of fabric egress ports at opposite ends of dynamically switched data paths. Switch fabric 32 is configured to forward packets from a fabric ingress port to a fabric egress port of switch fabric 32. In one embodiment, each crosspoint of switch fabric 32 may include buffers with various traffic classes, for example, for segregating packets of different classes.

NPIs 33-36 are configured to transmit and receive packets and link control messages across a communication link. Each NPI may have a pair of channels, such as a transmit (Tx) channel and a receive (Rx) channel. Each channel may have two serializer/deserializer (SerDes) lanes.

Fabric chip 30 further includes a credit manager 31 which is configured to validate one or more credit flows as a producer and/or consumer. In one exemplary credit flow, fabric chip 30 may be at the receiving end of the communication channel between node chip 10 and fabric chip 30. As such, the consumer may be a buffer within fabric chip 30 and node chip 10 may include a producer. In another exemplary credit flow, fabric chip 30 may be at the transmitting end of the communication channel between node chip 20 and fabric chip 30 and as such fabric chip 30 may be the producer of credits and node chip 20 may be the consumer of the credits.

A single fabric chip 30 is shown as being operatively coupled to node chip 10, node chip 20, node chip 40, and node chip 50. In other embodiments, a plurality of fabric chips may be used.

The flow of credits between a producer and a consumer may be validated. For example, the flow of credits between the producer node 10 and the consumer fabric chip 30 may be checked for consistency and a credit gain or credit loss may be detected by a credit manager 12 of the producer node chip 10.

One or more credit counters may be maintained by credit manager 12. In one embodiment, each credit counter is initialized with a number of credits apportioned to the producer node chip 10 for a resource. The credits represent the availability of the resource. The resource may include a buffer at a crosspoint in a fabric chip, such as fabric chip 30, or any shared or limited resource in a backplane fabric.

In another embodiment, the credit manager at the receiving end of the communication link is initialized with a number of credits (as "recovered" credits) equal to the amount of buffering it has to offer. These credits are then "returned" to the producer as the system starts to operate. This approach has the advantage of tying the initialized amount to the device that contains the buffering that determines how many credits should be present in the system.

As packets are placed on the link for transmission from the producer to the consumer, the credit counter maintained by the producer, such as node chip 10, is decremented by a number of credits corresponding to the size of a packet. In other words, the credit counter may be decremented by a number of credits corresponding to the amount of the resource (e.g., buffer space) that would be occupied, for example, once the packet is received by the consumer fabric chip 30 and added to the buffer for the specified traffic class at a crosspoint. As used herein, credits represented by the traffic on the way to but not yet buffered by the receiver are referred to as "consumed credits for traffic in-flight" or "in-flight consumed credits."

The consumer may receive the packet, for example at a receive buffer at the crosspoint of a fabric switch. Credits corresponding to the amount of the resource that is occupied (i.e., buffered by the receiver) are referred to as "buffered consumed credits." Collectively, the in-flight consumed credits and buffered consumed credits may be referred to as "consumed credits," which are credits corresponding to the amount of the buffer resource that is occupied or will be occupied by data already sent.

When the packet is eventually removed from the queue (e.g., the packet is forwarded to a fabric egress port) and the resource is freed, the credits which had been consumed are ready to be returned to the producer. In one embodiment, credits may be returned one by one as they become available. In another embodiment, credits may be accrued and returned as a group of credits, such that credits are returned as a multiple of 8 for example. As used herein, credits corresponding to the amount of freed resource held by the receiver but not returned to the producer are referred to as "recovered credits." For example, in an embodiment in which credits are accrued and returned as a group, some small number of credits may be retained indefinitely until enough credits for a complete group have been accumulated. In this example, the credits which have been retained may be identified as recovered credits.

In one embodiment, the number of consumed and the number of recovered credits are captured by a single mutually atomic operation that avoids creating an inconsistency at a time where a credit changes from a consumed credit to a recovered credit, for example where a packet is removed from the queue and the credits associated therewith are reflected as recovered credits.

As used herein, credits which are on the way back to the producer but not yet been received (i.e. reflected in the credit counter) by the producer are referred to as "returned credits." The credit counter associated with the resource and maintained by the producer, such as node chip 10, may be updated to reflect the returned credits, at which point they cease to be returned credits. In one embodiment, the credit counter is incremented by the number of returned credits received.

In operation, a producer such as node chip 10 may send a request for a credit check to a consumer, for example contained in fabric chip 30. The request may be sent along the same path as the flow of data packets in the ordered channel. The request messages may remain ordered relative to the data packets. At or near the time of sending the request, a snapshot is determined of the credit counter as of the time that the request was transmitted in that the snapshot reflects all traffic sent prior to the request and none of the traffic sent after. The credit counter may be maintained by node chip 10 and associated with a buffer or other resource of fabric chip 30. The snapshot may be a counter initialized with the same number of credits as the credit counter at the time the request is sent. The snapshot may be updated by the returned credits received. Unlike the credit counter, the snapshot is not decremented, for example, when packets outside of the roundtrip are sent.

In order to validate the credit flow, the number of outstanding credits between the consumer and the producer are determined. As used herein, the outstanding credits is a number of credits that were outstanding at the time the credit check was initiated and that have not yet been returned at the time the response is received. Specifically, the outstanding credits include the number of consumed and recovered credits that relate to traffic sent prior to the credit check request for which returned credits have not been received (i.e. reflected in the credit counter) at the sender prior to receipt of the credit check response. The consumer, such as fabric chip 30 may provide a response message to the credit check, which includes the number of outstanding credits. The response message may be sent along a reverse direction channel as used by the flow of data packets. The response messages may remain ordered relative to the returned credits. Node chip 10 may receive the response to the credit check.

Credit manager 12 may determine the sum of the updated snapshot as reported in the response and the outstanding credits and compare the sum to the total number of credits allocated to the producer. A match may indicate that the credit flow is consistent and thus may be validated. In one embodiment, there may be some amount of tolerance in a credit error between the sum and the allocated credits in the case of a credit loss. As such, the credit flow may be considered as being sufficiently consistent that immediate corrective action is not required if the credit error is within a tolerable amount of a credit loss.

In another embodiment, where fabric chip 30 is a producer, validation of the credit flow is performed by credit manager 31. The resource that corresponds to the credits for data transfers from fabric chip 30 to node chip 20 may include buffers on the consumer (i.e., node chip 20). The credit counter and snapshot may be maintained on fabric chip 30. The snapshot may be determined upon transmitting the request for a credit check. Credit manager 31 may compare the sum of the snapshot, returned credits, recovered credits, and consumed credits to the total number of credits allocated to the producer.

A pair of NPIs at the ends of a given link, such as NPIs 13 and 33, implement a single bidirectional communication link between two chips. This communication link includes a pair of ordered channels, one in each direction, such as a transmit (Tx) channel and a receive (Rx) channel. In one embodiment, each ordered channel may have a pair of serializer/deserializer (SerDes) lanes. As previously mentioned, the lanes are synchronized to form the bidirectional communication link. The transferred data packets and the credit check requests may be transferred in one direction of the communication link and the credit check responses and returned credits in the other direction.

Credit check request messages are ordered relative to data transfers. Credit check response messages are ordered relative to returned credits. Accordingly, the sum of the updated snapshot value while the credit check was in progress and the count returned by the consumer in the credit check response reflects the total number of credits available on that communication link between the producer and the consumer. This sum may be compared to the number of credits allocated to the producer for access to the particular resource. The result of the comparison may be used to determine whether an error has occurred.

As previously described, there is an ordered path on the transmit side and on the return or receive side of the communication link. The return path has been described as being a reverse direction of the ordered channel. In another embodiment, the return path may include a separate ordered communication link.

As described herein, embodiments of the present invention may be applied in a communication system for between-chip communication, on-chip communication, network-on-a-chip applications, or other communication system in which an interface passes data from one unit to another using a credit-based mechanism for controlling the flow of data between the two units. For example, consistency checking and/or validation may be performed on a computer system, such as a server, for data flows between memory units and processors.

In addition, the present invention may be also applied in various network topologies and environments. Backplane fabric and nodes as described herein may be incorporated into any type of network familiar to those skilled in the art that can support ordered data communications using any of a variety of commercially-available protocols.

Figure 1B:
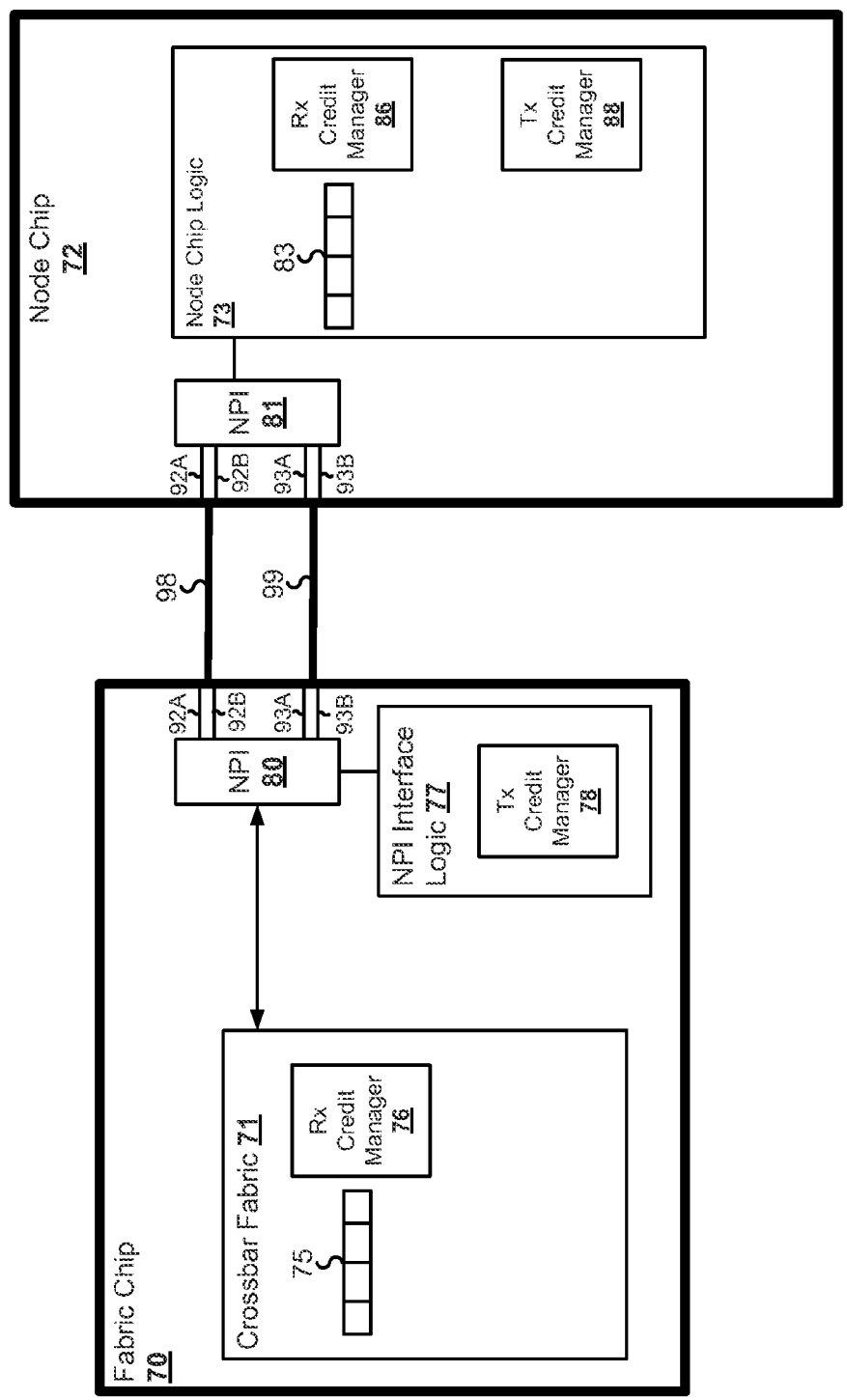
FIG. 1B is a topological block diagram of a single bidirectional communication link between a backplane fabric and a node of a network system 170 in accordance with an embodiment of the invention.

FIG. 1B is a topological block diagram of a single bidirectional communication link between a backplane fabric and a node of a network system 170 in accordance with an embodiment of the invention. Backplane fabric and node of system 170 are generally configured to switch packets from ingress node to an egress node. As shown, system 170 includes fabric chip 70 and node chip 72.

As shown, fabric chip 70 includes an NPI 80, an NPI Interface logic 77, and a crossbar fabric 71. Fabric chip 70 is operatively coupled to node chip 72 via NPI 80, Tx channel 98, and Rx channel 99. NPI 80 is configured to transmit and receive packets and link control messages across a communication link. NPI 80 includes a SerDes lane 92A, a SerDes lane 92B, a SerDes lane 93A, and a SerDes lane 93B. In one exemplary flow, SerDes lane 92A and a SerDes lane 92B make up Tx channel 98, and SerDes lane 93A and SerDes lane 93B make up Rx channel 99. It should be recognized that for another flow in the opposite direction, the roles of channel 98 and channel 99 may be reversed. The pair of NPI 80 and NPI 81 implement a single bidirectional communication link between fabric chip 70 and node chip 72. NPI 80 is operatively coupled to crossbar fabric 71, a NPI Interface Logic 77, and to the node chip 72.

NPI Interface Logic 77 is operatively coupled to NPI 80. NPI Interface Logic 77 includes transmit (Tx) credit manager 78, which is configured to track credits available for sending data.

Crossbar fabric 71 may be an embodiment of switch fabric 32 in FIG. 1A. Crossbar fabric 71 may be a buffered crossbar, and include a plurality of fabric ingress ports and a plurality of fabric egress ports at opposite ends of dynamically switched data paths. Crossbar fabric 71 is configured to forward packets from a fabric ingress port to a fabric egress port of crossbar fabric 71. Crossbar fabric 71 includes a buffer 75 with various traffic classes. Buffer 75 may be the resource to which a specific allowance of credits pertains.

Crossbar fabric 71 further includes a receive (Rx) credit manager 76 which is configured to track how input buffer 75 is used and return credits as space in input buffer 75 is freed.

As shown, separate credit managers are maintained for a receiving end of a directional communication link and for a transmitting end of a directional communication link. In one embodiment, the accounting efforts are aggregated into a single credit manager on fabric chip 70 across multiple paths or buffers.

Node chip 72 may be an ingress and/or egress line card of the network switch. Node chip 72 is operatively coupled to fabric chip 70 via NPI 81. NPI 81 is configured to transmit and receive packets and link control messages across a communication link. NPI 81 includes a SerDes lane 92A, a SerDes lane 92B, a SerDes lane 93A, and a SerDes lane 93B. In one exemplary flow, SerDes lane 92A and a SerDes lane 92B make up Tx channel 98, and SerDes lane 93A and SerDes lane 93B make up Rx channel 99. As previously described, the roles of channel 98 and channel 99 may be reversed for another flow in the opposite direction. The pair of NPI 80 and NPI 81 implements a single bidirectional communication link between fabric chip 70 and node chip 72. NPI 81 is operatively coupled to a node chip logic 73 and to the fabric chip 70.

Node chip logic 73 is operatively coupled to NPI 81. Node chip logic 73 includes an input buffer 83, Rx credit manager 86, and Tx credit manager 88. Rx credit manager 86 is configured to track how input buffer 83 is used and return credits as space in input buffer 83 is freed. Tx credit manager 86 is configured to track credits available to send data.

Figure 2A:
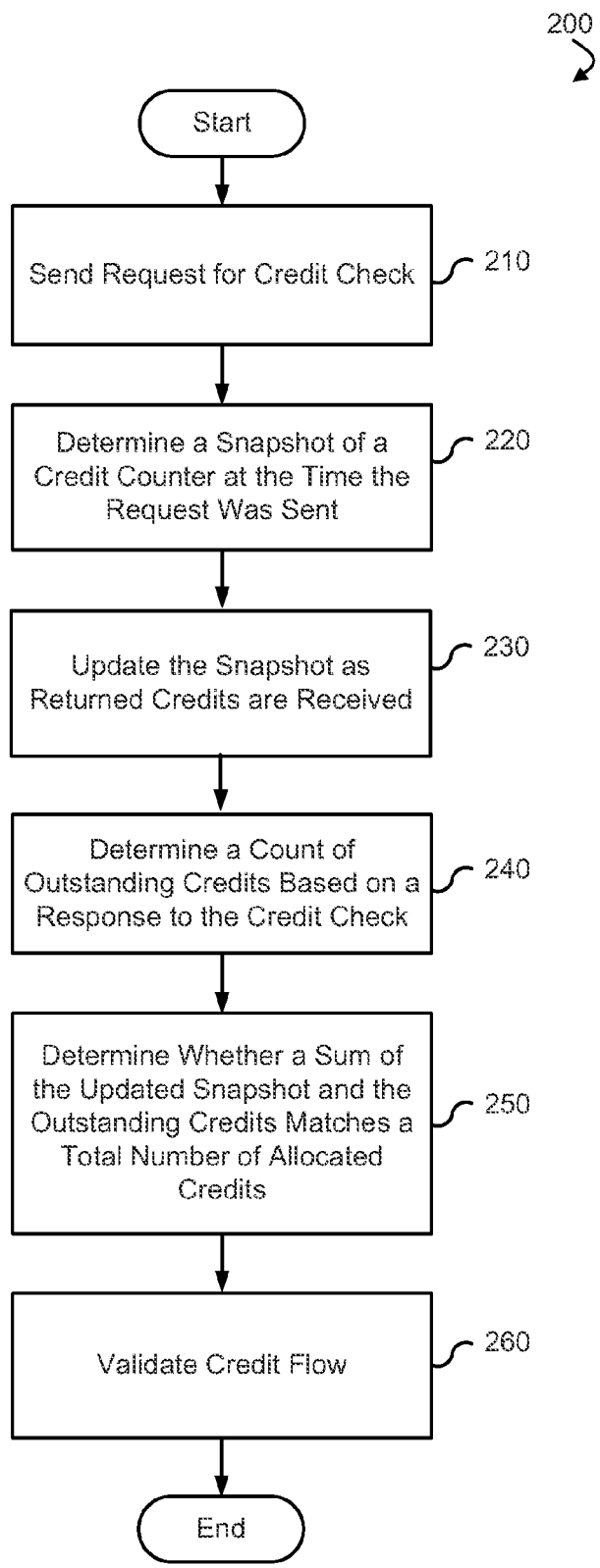
FIG. 2A is a process flow diagram for validation of credits in a credit-based flow control system in accordance with an embodiment of the invention.

FIG. 2A is a process flow diagram for validation of credits in a credit-based flow control system in accordance with an embodiment of the invention. The depicted process flow 200 may be carried out by execution of one or more sequences of executable instructions. In another embodiment, the process flow 200 is carried out by execution of components of a network device, an arrangement of hardware logic, e.g., an Application-Specific Integrated Circuit (ASIC), etc.

In a system for between-chip communication between a producer and a consumer, credit flows may be used to manage access to a limited resource. In one embodiment, a resource is associated with a total number of credits. The credits represent the availability of the resource.

One or more credit counters may be maintained, for example by the producer. Each credit counter may be initialized with the number of credits allocated on a per-resource and per-producer basis. In other words, each credit counter may be initialized with the number of credits allocated to a particular producer for access to a particular resource. As packets are sent from the producer or received by the consumer, the credit counter associated with the producer and the resource is decremented by a number of credits corresponding to the size of a packet. As the resource is freed, credits are returned to the credit counter, allowing more data to be sent.

A credit flow may be validated, even while credits are moving between the producer and consumer. At step 210, a request for a credit check may be sent. The credit check request may function as a "start" marker for a roundtrip of a flow. The credit check request may be initiated by the producer on a periodic basis. In one embodiment, each producer may perform a credit check process for one consumer at a time, possibly reusing a single snapshot counter and set of control resources for each such check. The producer may cycle through all associated consumers at a rate that represents a negligible fraction of a fabric interface bandwidth. The credit check request may be for a report on the portion of the memory space in use and the number of credits waiting to be returned.

At step 220, a snapshot of the credit counter is determined at the time the request was sent. For example, a snapshot counter may be set to the value of the credit counter at the time the request was sent. The snapshot counter reflects the adjustment for credits that were used for all data packets that entered a communication channel prior to sending the credit check request. It should be noted that the snapshot does not include the consumption of credits for data that entered the communication channel after the credit check request was sent.

The snapshot is updated as returned credits are received, at step 230. In one embodiment, the number of credits of the snapshot is incremented by the number of returned credits. Furthermore, the snapshot may be incremented thereafter to reflect all subsequent returned credits until such time as a response to the credit check is received, for example, from the consumer. In one embodiment, the credit check response is an "end" marker in the roundtrip of the flow. As such, the updated snapshot reflects all returned credits received from the consumer prior to receiving the credit check response and none of the returned credits received after the credit check response is received. In one embodiment, if no returned credits arrive during the roundtrip window, there is no update.

At step 240, a number of outstanding credits are determined based on a response to the credit check request. In one embodiment, the consumer provides a credit check response message to the producer via a reverse direction channel which is ordered relative to returned credits. The reverse direction channel is the reverse direction of the same ordered communication link through which data packets and the request flows. As previously described, the outstanding credits include a number of the consumed credits and a number of the recovered credits. The response message may include the number of outstanding credits.

The credit flow may be checked for consistency. At step 250, it is determined whether a sum of the updated snapshot and the outstanding credits matches a total number of allocated credits. As previously mentioned, credits are allocated on a per-resource and per-producer basis.

The total number of credits allocated to the specific producer for access to the specific resource is compared with the sum of the updated snapshot and the outstanding credits. If the values do not match, there is an inconsistency in the credit flow. A credit loss may be determined where the sum of the updated snapshot and the outstanding credits is lower than the allocated credits. A gain of excess credits may be determined to be present in the flow where the sum of the updated snapshot and the outstanding credits is higher than the allocated credits. In one embodiment, error handling may include a reset of the credit flow.

At step 260, the credit flow is validated, for example, where no inconsistency is detected in the credit flow.

As such, errors introduced into the credit flow control may be detected and corrected before leading to more serious failures. Moreover, detection may be performed without interrupting the ongoing normal use of the communication channel.

Figure 2B:
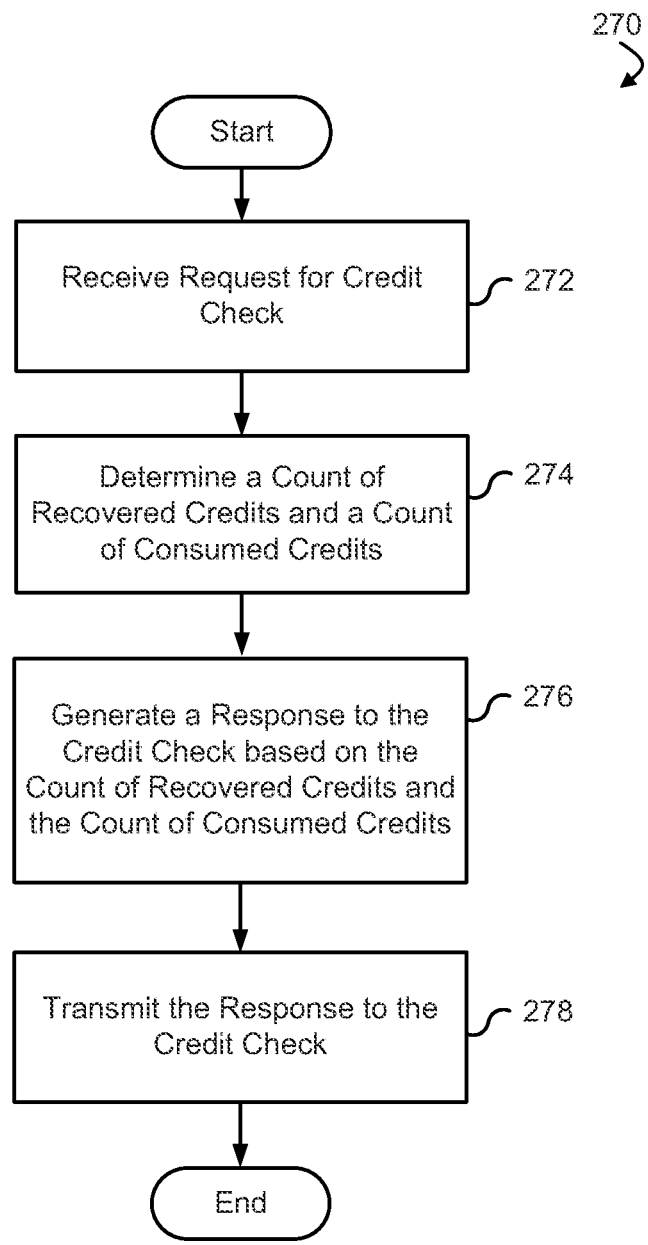
FIG. 2B is a process flow diagram for generating a response to a credit check request in a credit-based flow control system in accordance with an embodiment of the invention.

FIG. 2B is a process flow diagram for generating a response to a credit check request in a credit-based flow control system in accordance with an embodiment of the invention. The depicted process flow 270 may be carried out by execution of one or more sequences of executable instructions. In another embodiment, the process flow 270 is carried out by execution of components of a network device, an arrangement of hardware logic, e.g., an Application-Specific Integrated Circuit (ASIC), etc.

In a system for between-chip communication between a producer and a consumer, credit flows may be used to manage access to a limited resource. Credit flow validation may be performed using information contained in a response to a credit check request. In one embodiment, the response is provided by a consumer.

At step 272, a request for a credit check is received. A number of recovered credits and a number of consumed credits are determined at step 274. In one embodiment, the consumer maintains separate counters for the number of recovered credits and consumed credits. In another embodiment, the number of consumed credits is calculated, for example, by determining the amount of a resource being occupied and determining a number of credits corresponding to the occupied portion of the resource.

The number of recovered credits and the number of consumed credits may reflect the adjustment for all data received from the producer prior to receiving the credit check request message. The number of credits consumed after the credit check request was received is not reflected in the number of consumed credits.

Furthermore, the number of recovered credits reflects all of the recovered credits that were accumulated by the consumer but not reported to the producer prior to issuing a response to the credit check. If recovered credits were reported prior to issuing the response, those credits are not reflected in the number of recovered credits.

At step 276, a response to the credit check is generated based on the number of recovered credits and the number of consumed credits. The response may be a credit check response message which includes a total number of recovered and consumed credits. The response to the credit check may be transmitted at step 278, for example by the consumer.

Figure 3A:
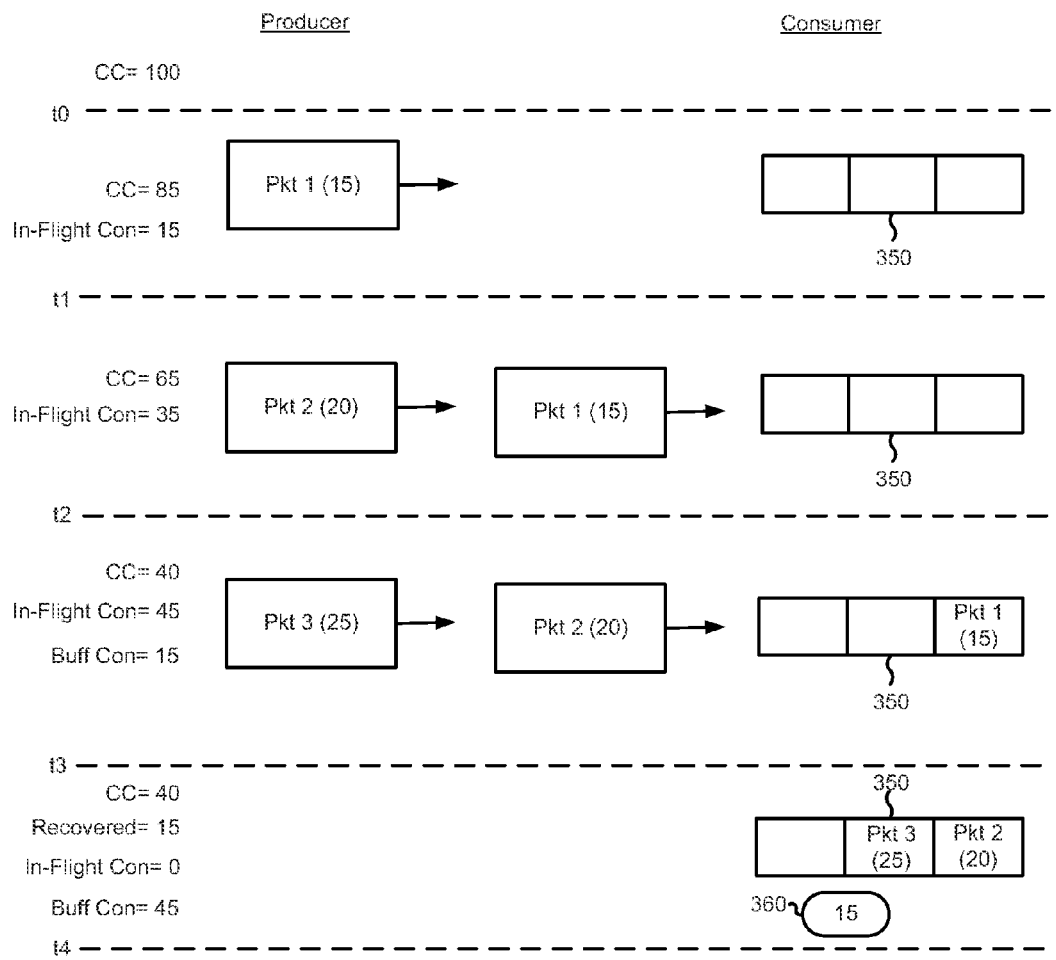
FIG. 3A is a diagram of a credit flow in accordance with an embodiment of the invention.

FIG. 3A is a diagram of a credit flow in accordance with an embodiment of the invention. In a credit-based flow control system, each credit represents a resource, such as a buffer location, which is allocated to a producer for sending data to a consumer. A credit counter ("cc") may be initialized with a number of credits (i.e., 100 credits) allocated to the producer for access to buffer 350, shown as being a resource of the consumer. In other embodiments, the resource may be located elsewhere in a backplane fabric.

Between $t_0$ and $t_1$, packet 1 is sent from producer to consumer. The size of the packet corresponds to 15 credits, and as such, the credit counter is decremented by this amount to 85. Accounting for packet 1, the number of in-flight consumed credits ("In-Flight Con") is 15. Buffer 350 is empty at this time.

Between $t_1$ and $t_2$, packet 2 having a size corresponding to 20 credits, is sent from producer to consumer. The credit counter is decremented by 20 credits to a number of 65 credits. Accounting for packet 1 and packet 2, the number of in-flight consumed credits is 35.

Between $t_2$ and $t_3$, packet 3 having a size corresponding to 25 credits, is sent from producer to consumer. The credit counter is decremented by 25 credits to a number of 40 credits. Accounting for packet 2 and packet 3, the number of in-flight consumed credits is 45. As shown, packet 1 is stored in buffer 350, and as such, a number of buffered consumed credits ("Buff Con") is 15 credits. For example, packet 1 may be stored in buffer 350 prior to being forwarded to an egress port of the consumer.

Between $t_3$ and $t_4$, Packet 1 may have been forwarded, thus freeing the space previously occupied by packet 1 in buffer 350. The credits corresponding to the freed space (i.e., 15 credits) may be made available to be sent back, but have not as yet been sent back to the producer via a control message 360, bringing the recovered credits count to 15 credits. Packets 2 and 3 are stored in buffer 350, bringing the buffered consumed credits count to 45 credits.

Figure 3B:
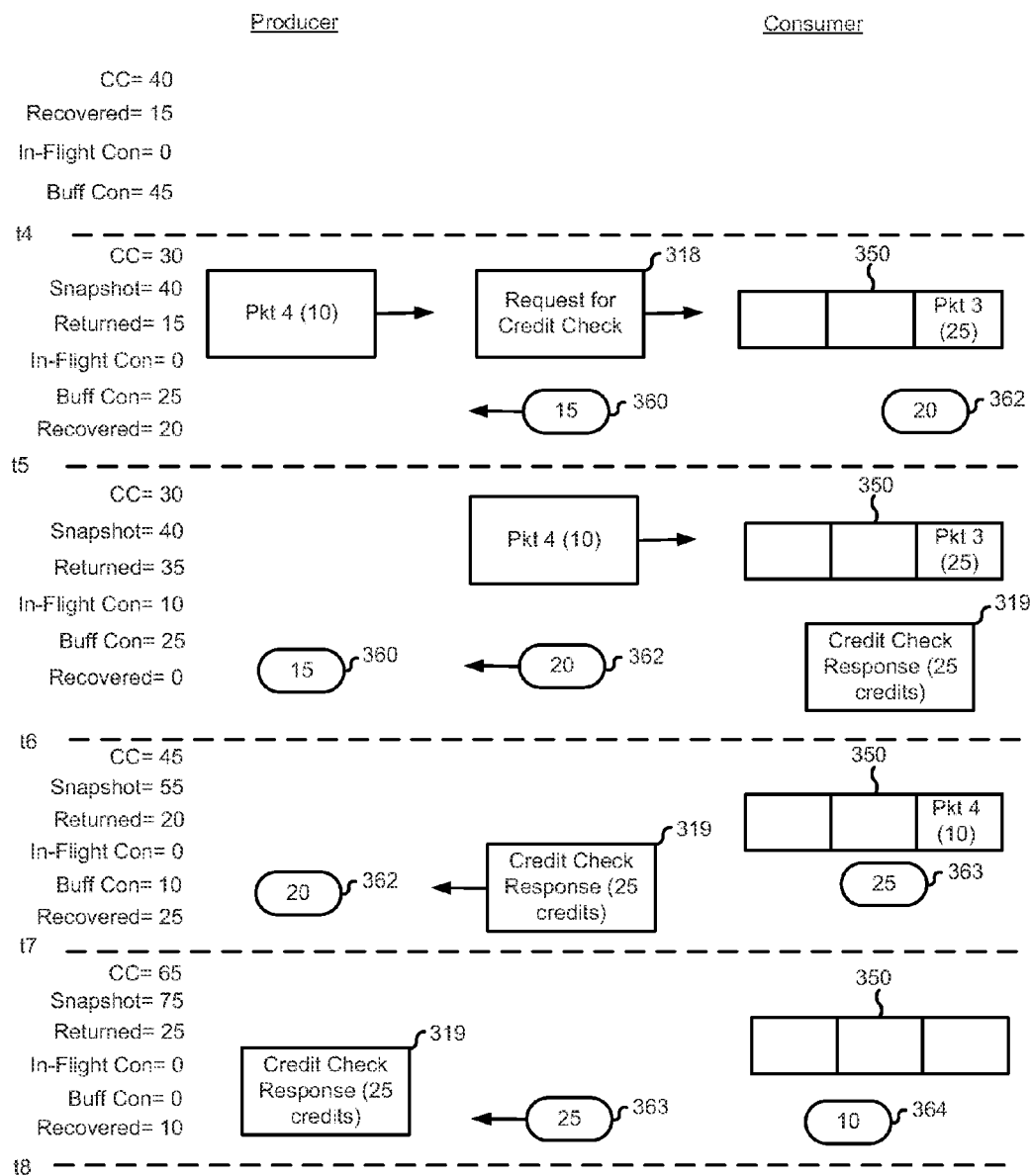
FIG. 3B is another diagram of a credit flow in accordance with an embodiment of the invention.

FIG. 3B is a process flow diagram for generating a response to a credit check request in a credit-based flow control system in accordance with an embodiment of the invention. FIG. 3B continues the exemplary credit flow of FIG. 3A.

Between $t_4$ and $t_5$, a request for credit check 318 is sent to the consumer and a snapshot of the credit counter is determined to be 40 credits, which is the value of the credit counter at the time the request for credit check 318 was sent.

Following the request for credit check 318, the producer sends packet 4. The size of packet 4 corresponds to 10 credits, and as such, the credit counter is decremented by 10 credits to 30. It should be noted that the snapshot is not decremented. Meanwhile, 15 credits is represented in control message 360, which corresponded to packet 1. Control message 360 sends 15 credits back to the producer, and this number is reflected in the number of returned credits. Packet 2 may have been forwarded out of buffer 350 bringing the recovered credit count to 20. Packet 3 remains in buffer 350, bringing the buffered consumed credit count to 25.

Between $t_5$ and $t_6$, the request for credit check 318 is received by the consumer. Furthermore, the 20 credits, which corresponded to packet 2, is sent back to the producer through control message 362. As such, the number of returned credits is incremented to 35. Packet 4 has been transmitted and the credits corresponding thereto are reflected in the number of in-flight consumed credits.

As shown, buffer 350 includes packet 3 occupying space of 25 credits. Accordingly, the number of buffered consumed credits is a 25. A credit check response 319 is ready to be transmitted. As shown, the credit check response 319 indicates that 25 credits is the total number of outstanding credits in the flow. The total number of outgoing credits may be the sum of the number of consumed credits (e.g., 25 credits) and the number of recovered credits (e.g., 0 credits).

Between $t_6$ and $t_7$, the snapshot is updated to reflect the returned credits. As such, the number of the updated snapshot may be 55 credits (e.g., 40 credits plus 15 credits). The credit counter may be updated by the number of returned credits as well.

The returned credits reflects 20 credits returned through control message 362. A credit check response 319 is transmitted from the consumer to the producer. Buffer 350 includes packet 3 occupying space of 10 credits. Accordingly, the number of buffered consumed credits is a number of 10. Packet 3 may have been forwarded out of buffer 350. A value of 25 credits, which corresponds to packet 3, is represented in control message 363, and this count is reflected in the number of recovered credits.

Between $t_7$ and $t_8$, the snapshot is updated to reflect the returned credits. As such, the number of the updated snapshot may be 75 credits (e.g., 55 credits plus 20 credits). The credit counter may be updated by the number of returned credits as well. Control message 363 is transmitted, and the number of 25 credits represented therewith is reflected in the number of returned credits. Packet Hay have been forwarded out of buffer 350. A value of 10 credits, which corresponds to packet 4, is represented in control message 364, and this count is reflected in the number of recovered credits. There are no in-flight consumed credits. Buffer 350 is empty and as such, there are no buffered consumed credits.

Validation may be performed. The sum of the updated snapshot and the credits reported in the credit check response may be compared to the number of the allocated credits. The updated snapshot count at $t_8$ is 75 credits. The number of credits reported in the credit check response is 25 credits. Since the sum of the updated snapshot and the credits reported in the credit check response is 100 credits (i.e., 75 credits from the updated snapshot plus 25 credits reported in the credit check response), the credit flow is consistent and may be validated.

Figure 4A:
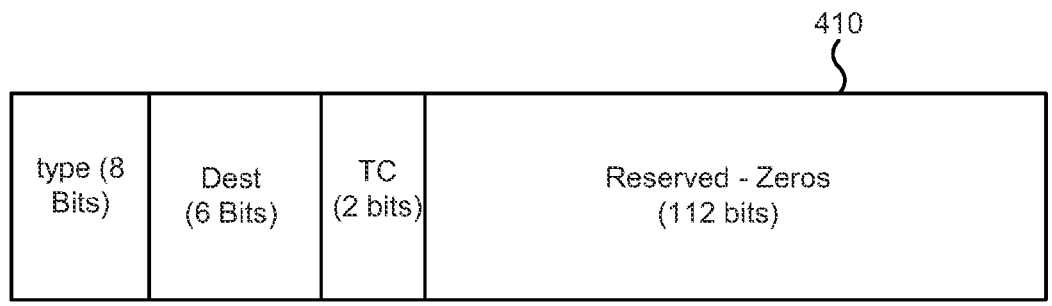
FIG. 4A is a simplified high-level block diagram of a link control message including a request for a credit check in accordance with an embodiment of the invention.

FIG. 4A is a simplified high-level block diagram of a link control message 410 including a request for a credit check in accordance with an embodiment of the invention. A credit manager at a producer may send a request message in the form of link control message 410 for a credit check.

Link control message 410 is used for local communication between a node and a switch fabric. In one embodiment, traffic is organized in 128 bit long words. Link control message 410 occupies one such long word. Link control message 410 includes an 8 bit type field and a 120 bit control field. The type field identifies the packet as being a credit check request. The 120 bit control field may include a 6 bit destination field and a 2 bit traffic class ("TC") field. Together, the destination field and the "TC" field identify the particular resource, i.e., buffer for a particular class, to which the credit check refers. The remaining 112 bits in the control field are zero.

Figure 4B:
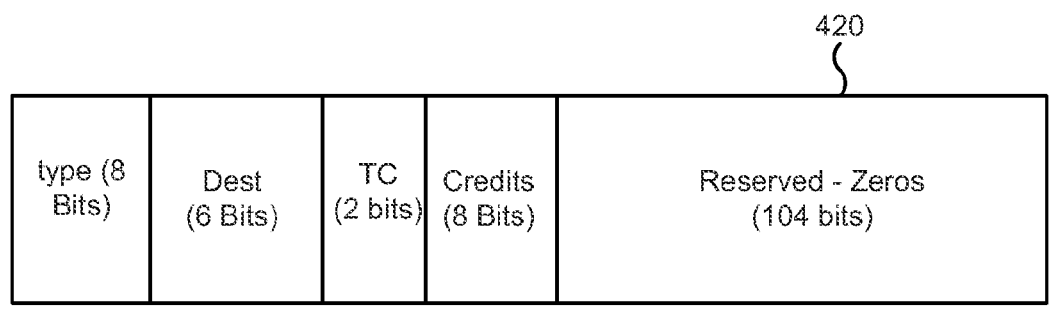
FIG. 4B is a simplified high-level block diagram of a link control message including a response to a credit check in accordance with an embodiment of the invention.

FIG. 4B is a simplified high-level block diagram of a link control message 420 including a response to a credit check in accordance with an embodiment of the invention. A credit manager at a consumer may send a response message in the form of link control message 420 upon receiving a request for a credit check.

Link control message 420 is used for local communication between a node and a switch fabric. Link control message 420 occupies a 128 bit long word. Link control message 420 includes an 8 bit type field and a 120 bit control field. The type field identifies the packet as being a credit check response. The 120 bit control field may include a 6 bit destination field and a 2 bit traffic class ("TC") field. Together, the destination field and the "TC" field identify the particular resource, i.e., buffer for a particular class, from which the credit check response was returned. An 8 bit credit field may include the combined number of consumed credits and recovered credits as previously discussed. The remaining 104 bits in the control field are zero.

It will be appreciated that embodiments of the present invention can be realized in the form of hardware, software, firmware, or any combination thereof. Any such software may be stored in a computer system including a processor and a storage in the form of volatile or non-volatile storage, such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. The storage may be located outside of a node chip of a computer system such as a network device and may be operatively connected to a processor of the node chip. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A credit-based method for controlling data communications in a computer system between a sender and a receiver coupled by an ordered communication link, the method comprising:
    transmitting a request for a credit check from the sender to the receiver via the ordered communication link, wherein an initial number of credits is allocated to the sender in a credit counter, each credit corresponding to a portion of memory space in the receiver reserved to store a packet received from the sender;
    setting a snapshot counter to a value of the credit counter;
    updating the snapshot counter as returned credits are received;
    determining a number of reported credits based on a credit check response message received from the receiver, wherein the returned credits are ordered relative to the credit check response message; and
    checking the number of credits in the computer system for consistency based on a number of the snapshot counter and the number of reported credits.

2. The method of claim 1, wherein the snapshot counter is set to the value of the credit counter as of the time the request was transmitted.

3. The method of claim 1, wherein the number of reported credits includes a number of credits corresponding to an amount of freed memory space and a number of credits corresponding to an amount of occupied memory space.

4. The method of claim 3, wherein the number of credits corresponding to an amount of freed memory space excludes credits returned to the sender.

5. The method of claim 1, further comprising:
    ascertaining a sum of the number of the snapshot counter and the number of reported credits; and
    comparing the sum to the initial number of credits allocated to the sender.

6. The method of claim 5, further comprising:
    determining the sum matches the initial number of credits allocated to the sender; and
    validating the flow of credits from the sender to the receiver via the ordered communications channel.

7. The method of claim 1, further comprising:
    determining an inconsistency with the number of credits in the computer system upon detection of a credit loss or a credit gain.

8. The method of claim 1, wherein the response message is received via a reverse direction of the ordered communication link.

9. A network device for credit-based flow control, the device comprising:
    a sender node including a credit manager;
    a receiver node including a buffer; and
    a first ordered communication link, coupling the sender node to the receiver node for transmission of data packets from the sender node to the buffer of the receiver node; wherein the credit manager is configured to:
        transmit a request for a credit check from the sender node to the receiver node via the first ordered communication link, wherein an initial number of credits is allocated to the sender node in a credit counter, each credit corresponding to a portion of buffer space in the receiver node reserved to store data packets received from the sender node;
        set a snapshot counter to a value of the credit counter;
        update the snapshot counter as returned credits are received;
        determine a number of reported credits based on a credit check response message received from the receiver, wherein the returned credits are ordered relative to the credit check response message; and
        check the number of credits in the network device for consistency based on a number of the snapshot counter and the number of reported credits.

10. The method of claim 9, wherein the snapshot counter is set to the value of the credit counter as of the time the request was transmitted.

11. The method of claim 9, wherein the number of reported credits includes a number of credits corresponding to an amount of freed buffer space and a number of credits corresponding to an amount of occupied buffer space.

12. The method of claim 11, wherein the credit manager is further configured to:
    ascertain a sum of the number of the snapshot counter and the number of reported credits; and
    compare the sum to the initial number of credits allocated to the sender.

13. The method of claim 9, the device further comprising a second ordered communication link, coupling the sender node to the receiver node for transmission of data packets from the receiver node to a buffer of the receiver node, wherein the response message is received via the second ordered communication link.

14. A non-transitory computer-readable medium storing a plurality of instructions for controlling a data processor for controlling data communications in a computer system between a sender and a receiver coupled by an ordered communication link, the plurality of instructions comprising:

instructions that cause the data processor to transmit a request for a credit check from the sender to the receiver via the ordered communication link, wherein an initial number of credits is allocated to the sender in a credit counter, each credit corresponding to a portion of memory space in the receiver reserved to store a packet received from the sender;

instructions that cause the data processor to set a snapshot counter to a value of the credit counter;

instructions that cause the data processor to update the snapshot counter as returned credits are received;

instructions that cause the data processor to determine a number of reported credits based on a credit check response message received from the receiver, wherein the returned credits are ordered relative to the credit check response message; and instructions that cause the data processor to check the number of credits in the computer system for consistency based on a number of the snapshot counter and the number of reported credits.

15. The non-transitory computer-readable medium of claim 14, wherein the snapshot counter is set to the value of the credit counter as of the time the request was transmitted.

16. The non-transitory computer-readable medium of claim 14, wherein the number of reported credits includes a number of credits corresponding to an amount of freed memory space and a number of credits corresponding to an amount of occupied memory space.

17. The non-transitory computer-readable medium of claim 16, wherein the number of credits corresponding to an amount of freed memory space excludes credits returned to the sender.

18. The non-transitory computer-readable medium of claim 14, wherein the response message is received via a reverse direction of the ordered communication link.

19. The non-transitory computer-readable medium of claim 14, wherein the plurality of instructions further comprise:

instructions that cause the data processor to ascertain a sum of the number of the snapshot counter and the number of reported credits; and instructions that cause the data processor to compare the sum to the initial number of credits allocated to the sender.

20. The non-transitory computer-readable medium of claim 14, wherein the plurality of instructions further comprise instructions that cause the data processor to determine an inconsistency with the number of credits upon detection of a credit loss or a credit gain.

* * * * *